UNITED STATES PATENT OFFICE.

THOMAS S. TUGGLE, OF COLUMBUS, GEORGIA.

IMPROVED MEDICAL COMPOUND.

Specification forming part of Letters Patent No. 88,680, dated April 6, 1869.

*To all whom it may concern:*

Be it known that I, THOMAS S. TUGGLE, M. D., of the city of Columbus, in the county of Muscogee and State of Georgia, have invented a new and useful Compound Sirup Globe-Flower, a vegetable mixture, free from opium, for the cure of coughs, colds, croups, asthma, bronchitis, hoarseness, spitting of blood, whooping-cough, influenza, difficult breathing, and all pulmonary diseases; and the following is a full, clear, and exact description of the same, with the names of the several ingredients, and the proportion of each in the mixture, as follows:

Take of blood-root one quarter of a pound; wild-cherry bark, one-half pound; globe-flower, one pound; water, one gallon. Boil to one quart; strain; add one quart honey; boil gently to one quart; cool, and add one drop of prussic acid to each dram of the mixture, and bottle for use.

The medicinal properties of the globe-flower for all pulmonary diseases were first discovered by me during the late war, and its use in various forms became very extensive in the South, and has proved itself to be the best and most effective agent of any one article that has ever come to my knowledge; and by combining it with the other well-known ingredients, and preparing it in the manner as above described, making a compounded sirup of globe-flower, it is regarded now as the *sine qua non*—an indispensable article wherever it is known.

What I claim, and desire to secure by Letters Patent, is—

The compound sirup globe-flower, substantially as herein described.

In testimony whereof I hereunto subscribe my name.

THOMAS S. TUGGLE, M. D.

Witnesses:
J. B. WOODRUFF,
BAXTER D. WHITNEY.